(12) United States Patent
Li et al.

(10) Patent No.: US 11,024,314 B2
(45) Date of Patent: Jun. 1, 2021

(54) METHOD AND APPARATUS FOR ACQUIRING AND PROCESSING AN OPERATION INSTRUCTION

(71) Applicant: BANMA ZHIXING NETWORK (HONGKONG) CO., LIMITED, Kowloon (HK)

(72) Inventors: Xiaodong Li, Beijing (CN); Hongxing Wu, Beijing (CN)

(73) Assignee: BANMA ZHIXING NETWORK (HONGKONG) CO., LIMITED, Kowloon (HK)

( * ) Notice: Subject to any disclaimer, the term of this patent is extended or adjusted under 35 U.S.C. 154(b) by 400 days.

(21) Appl. No.: 14/757,751

(22) Filed: Dec. 23, 2015

(65) Prior Publication Data

US 2016/0259525 A1 Sep. 8, 2016

(30) Foreign Application Priority Data

Dec. 23, 2014 (CN) .......................... 201410816109.2

(51) Int. Cl.
*G10L 15/26* (2006.01)
*G10L 15/00* (2013.01)
(Continued)

(52) U.S. Cl.
CPC ............ *G10L 15/26* (2013.01); *G06F 3/0481* (2013.01); *G06F 3/0484* (2013.01);
(Continued)

(58) Field of Classification Search
CPC ............... G06F 3/04817; G06F 3/0481; G06F 3/04883; G06F 2203/0381; G10L 15/26
See application file for complete search history.

(56) References Cited

U.S. PATENT DOCUMENTS 9,495,128 B1 * 11/2016 Ledet ...................... G06F 16/29
9,734,839 B1 * 8/2017 Adams .................... G10L 21/00
(Continued)

FOREIGN PATENT DOCUMENTS

CN 102414994 A 4/2012
CN 103092981 A 5/2013
(Continued)

OTHER PUBLICATIONS

PCT International Search Report and Written Opinion dated Mar. 11, 2016, issued in corresponding International Application No. PCT/US15/00191 (9 pages).
(Continued)

*Primary Examiner* — Andrew L Tank
(74) *Attorney, Agent, or Firm* — Finnegan, Henderson, Farabow, Garrett & Dunner, LLP

(57) ABSTRACT

Systems and methods are provided for acquiring and processing operation instructions. The systems and methods may include receiving a first operation instruction. The system may determine an application associated with the first operation instruction, and determine whether the first operation instruction satisfies one or more predetermined conditions, wherein the predetermined conditions are associated with the application. The system may also, responsive to determining that the first operation instruction satisfies the predetermined conditions, and after the second operation instruction is received, invoke the application, and transmit the second operation instruction to the application for execution. The system may also, responsive to determining that the first operation instruction does not satisfy the predetermined conditions, execute the first operation instruction as a standalone instruction.

19 Claims, 4 Drawing Sheets

(51) Int. Cl.
  *G06F 3/0486*    (2013.01)
  *G06F 3/16*      (2006.01)
  *G10L 15/22*     (2006.01)
  *G06F 3/0481*    (2013.01)
  *G06F 3/0484*    (2013.01)
  *G06F 3/0488*    (2013.01)
  *G06F 9/30*      (2018.01)

(52) U.S. Cl.
  CPC ........ *G06F 3/0486* (2013.01); *G06F 3/04817* (2013.01); *G06F 3/04883* (2013.01); *G06F 3/167* (2013.01); *G06F 9/30189* (2013.01); *G10L 15/00* (2013.01); *G10L 2015/223* (2013.01)

(56) References Cited

U.S. PATENT DOCUMENTS

| | | | |
|---|---|---|---|
| 9,858,925 B2 * | 1/2018 | Gruber | G10L 15/18 |
| 10,347,246 B2 * | 7/2019 | Lee | G06F 3/0482 |
| 2004/0128140 A1 | 7/2004 | Deisher | |
| 2006/0085521 A1 | 4/2006 | Sztybel | |
| 2008/0300886 A1 * | 12/2008 | Patch | 704/275 |
| 2009/0112572 A1 * | 4/2009 | Thorn | G06F 3/038 |
| | | | 704/3 |
| 2009/0132944 A1 | 5/2009 | Carr et al. | |
| 2010/0312547 A1 * | 12/2010 | Van Os | G06F 3/167 |
| | | | 704/9 |
| 2011/0184730 A1 * | 7/2011 | LeBeau | G10L 15/30 |
| | | | 704/201 |
| 2011/0218808 A1 | 9/2011 | Parthasarathy | |
| 2013/0297304 A1 | 11/2013 | Kim et al. | |

FOREIGN PATENT DOCUMENTS

| | | |
|---|---|---|
| CN | 103197911 A | 7/2013 |
| CN | 103760969 A | 4/2014 |

OTHER PUBLICATIONS

First Chinese Office Action issued in Chinese Application No. 201410816109.2, dated May 3, 2018 (13 pages).
Second Chinese Office Action issued in Chinese Application No. 201410816109.2, dated Jan. 3, 2019 (10 pages).
First Chinese Search Report issued in Chinese Application No. 201410816109.2, dated Apr. 23, 2018, (1 page).

* cited by examiner

METHOD AND APPARATUS FOR ACQUIRING AND PROCESSING AN OPERATION INSTRUCTION

CROSS-REFERENCE TO RELATED APPLICATION

This application is based upon and claims priority to Chinese Patent Application No. 201410816109.2, filed Dec. 23, 2014, the entire contents of which are incorporated herein by reference.

TECHNICAL FIELD

The present disclosure generally relates to the field of computer technology and, more particularly, to a method and an apparatus for acquiring and processing an operation instruction.

BACKGROUND

With the rapid development of computer technology, people can obtain various services through an application software (app) installed on various terminal devices such as PCs (personal computers), mobile phones, and tablet computers. Apps can receive a user's operation instruction in various ways, such as by detecting mouse movements, keyboard strokes, hand gestures, etc. There are also apps that perform speech recognition and motion sensing to acquire operation instructions from the user.

At present, when a user wants to operate an app that supports speech recognition, typically the user first selects an icon of the app from the displayed desktop of the terminal, by means of a mouse, a keyboard, or touch, to bring up the app. The user then waits for the app to open. After the app is opened, the user then provides a speech instruction to the app. Since the app needs to be opened first before it can receive operation instructions, the operation becomes inefficient and inconvenient, and user experience is affected.

SUMMARY

The present disclosure provides a computer-implemented method for acquiring and processing operation instructions. The method comprises receiving a first operation instruction, determining an application associated with the first operation instruction, and determining whether the first operation instruction satisfies one or more predetermined conditions. The method further comprises: responsive to determining that the first operation instruction satisfies the predetermined conditions, and after a second operation instruction is received: invoking the application, and transmitting the second operation instruction to the application for execution. The method further comprises: responsive to determining that the first operation instruction does not satisfy the predetermined conditions, executing the first operation instruction as a standalone instruction.

In some embodiments, determining that the first operation instruction satisfies one or more predetermined conditions comprises: determining that the first operation instruction includes a user action directed to a display icon associated with the application.

In some embodiments, the determining that the first operation instruction satisfies one or more predetermined conditions comprises determining that the first operation instruction includes a pressing action or a gesturing action directed to at least part of the displayed icon for a predetermined duration.

In some embodiments, the determining that the first operation instruction satisfies one or more predetermined conditions comprises determining that the first operation instruction is not configured to drag at least part of the displayed icon out of a predetermined area within the predetermined duration.

In some embodiments, the determining that the first operation instruction satisfies one or more predetermined conditions comprises determining that the application is associated with a predetermined function.

In some embodiments, the method further comprises providing one or more suggestions for the second operation instructions based on the predetermined function.

In some embodiments, the second operation instruction comprises a speech command.

In some embodiments, the determining of an application associated with the first operation instruction comprises determining that the application is not capable of a speech operation; wherein the second operation instruction includes a speech command; and wherein the transmitting of the second operation instruction to the application comprises: converting the speech command to a non-speech command; and transmitting the non-speech command to the application.

In some embodiments, the second operation instruction is received during an execution of a first process. In some embodiments, the transmitting of the second operation instruction to the application for execution comprises: transmitting, via an object associated with the application, the second operation instruction from the first process to a second process associated with the application.

In some embodiments, the method further comprises adding the second process to a schedule, wherein the execution of the second process is scheduled at a predetermined time, determining whether the predetermined condition is satisfied before the predetermined time, and responsive to determining that the Predetermined condition is not satisfied before the predetermined time, removing the second process from the schedule.

In some embodiments, the determining of whether the predetermined condition is satisfied before the predetermined time comprises determining whether one or more events associated with a touch interface is detected.

In some embodiments, the adding of the second process to a schedule comprises adding an invoke-interface message to a main thread message queue associated with the application.

The present disclosure also provides a system for acquiring and processing operation instructions. The system comprises a memory device that stores a set of instructions. The system also comprises at least one processor capable of executing the set of instructions to: receive a first operation instruction, determine an application associated with the first operation instruction, and determine whether the first operation instruction satisfies one or more predetermined conditions, wherein the predetermined conditions are associated with the application. The at least one processor is also capable of executing the set of instructions to: responsive to determining that the first operation instruction satisfies the predetermined conditions, and after the second operation instruction is received: invoke the application, and transmit the second operation instruction to the application for execution. The at least one processor is also capable of the executing the set of instructions to: responsive to determining that the first operation instruction does not satisfy the predetermined conditions, execute the first operation instruction as a standalone instruction.

In some embodiments, the determining whether the first operation instruction satisfies one or more predetermined conditions comprises the at least one processor capable of executing the set of instructions to determine that the first operation instruction comprises a user action directed to a display icon associated with the application.

In some embodiments, the determining whether the first operation instruction satisfies one or more predetermined conditions comprises the at least one processor capable of executing the set of instructions to determine that the first operation instruction comprises a pressing action or a gesturing action directed to at least part of the displayed icon for a predetermined duration.

In some embodiments, the determining whether the first operation instruction satisfies one or more predetermined conditions comprises the at least one processor capable of executing the set of instructions to determine that the first operation instruction is not configured to drag at least part of the displayed icon of the application out of a predetermined area within the predetermined duration.

In some embodiments, the determining whether the first operation instruction satisfies one or more predetermined conditions comprises the at least one processor capable of executing the set of instructions to determine that the application is associated with a predetermined function.

In some embodiments, the second operation instruction comprises a speech command.

In some embodiments, the second operation instruction is received during an execution of a first process. In some embodiments, the transmitting of the second operation instruction to the application for execution comprises the at least one processor capable of executing the set of instructions to transmit, via an object associated with the application, the second operation instruction from the first process to a second process associated with the application.

In some embodiments, the at least one processor is capable of executing the set of instructions to add the second process to a schedule, wherein the execution of the second process is scheduled at a predetermined time. The at least one processor is also capable of executing the set of instructions to add the second process to determine whether the predetermined condition is satisfied before the predetermined time, and responsive to determining that the predetermined condition is not satisfied before the predetermined time, remove the second process from the schedule.

In some embodiments, the determining of whether the predetermined condition is satisfied before the predetermined time comprises determining whether one or more events associated with a touch interface is detected.

In some embodiments, the adding of the second process to a schedule comprises adding an invoke-interface message to a main thread message queue associated with the application.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

Currently, in order for a user to operate an app, the user needs to first activate the app from the desktop, wait for the app to open, and then provide an operating command to the app. As a result, the operation becomes inefficient and inconvenient, and user experience is affected.

Reference will now be made in detail to methods and specific implementations that seek to overcome the foregoing shortcomings of current systems and methods for acquiring and processing operation instructions. Examples of these implementations are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

According to embodiments of the present disclosure, after a terminal device receives a first operation instruction from a user, it determines whether the first operation instruction satisfies one or more predetermined conditions, and based on the determination, determines to forward a second operation instruction from the user to the app for processing. With embodiments of the present disclosure, a user needs not wait for an app to open in the desktop in order to operate the app. Instead, a user only needs to input a first operation instruction that satisfies the predetermined conditions, and then input a second operation instruction, which the terminal device can then forward to the app for processing. Therefore, the convenience and efficiency of user operation can be improved, and user experience can be enhanced.

Figure 1:
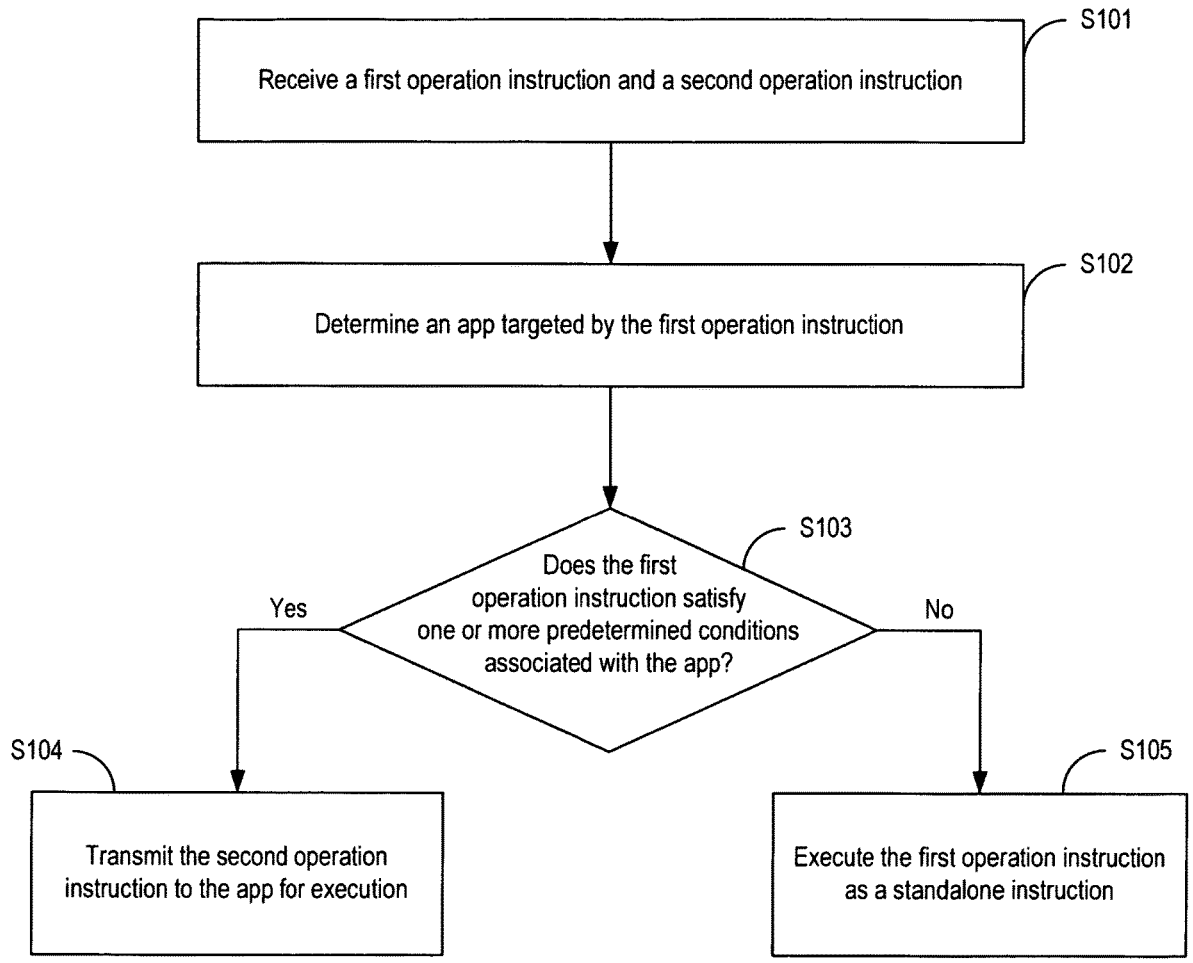
FIG. 1 is a flowchart illustrating an exemplary method for acquiring and processing operation instructions, consistent with embodiments of the present disclosure.

Reference is now made to FIG. 1, which illustrates an exemplary method 100 for acquiring and processing operation instructions, according to embodiments of the present disclosure. The method can be performed by a terminal device (e.g., a mobile phone) that is capable of receiving operation instructions from a user. It is understood that different steps of the method can also be performed by multiple devices. Referring to FIG. 1, method 100 includes the following steps.

In step S101, the terminal device receives one or more operation instructions. The operation instruction can include a first operation instruction that targets an app. As to be discussed below, the first operation instruction can be configured to cause the terminal device to detect and process a subsequent second operation instruction. In some embodiments, the first operation instruction will not bring out the app.

In step S102, the terminal device determines the app targeted by the first operation instruction. In some embodiments, the determination is based on detecting the first operation instruction directed to an icon associated with the app, where the icon is displayed on the terminal device.

In step S103, the terminal device determines whether the first operation instruction satisfies one or more predetermined conditions associated with the app determined in step S102. If the first operation instruction is determined to satisfy the predetermined conditions, the terminal device can perform step S104 to receive and execute a subsequent second operation instruction. If the first operation instruction is determined to not satisfy the predetermined conditions, the terminal device can perform step S105 to execute the first operation instruction as a standalone instruction, as to be discussed below.

In some embodiments, the predetermined conditions can include requiring the first operation instruction to include a predetermined action directed to the display icon of the app. For example, the predetermined conditions can be satisfied with a pressing action or a gesturing action directed to at least part of the displayed icon of the app for a duration that exceeds a predetermined threshold. As an illustrative example, the predetermined conditions can be satisfied when the terminal device determines that a user presses a displayed icon for more than one second.

In some embodiments, where the terminal device detects a combination of pressing and dragging action, the terminal device can treat the combination of actions as a first operation instruction, and the predetermined conditions can include criteria to be satisfied by one or more physical attributes associated with both the pressing action and the dragging action. For example, in a case where the duration of the pressing action exceeds the predetermined threshold, the terminal device further determines whether, within the duration, a dragging action occurs with the pressing action. If the terminal device determines that such a dragging action occurs, the terminal device can further determine whether the dragging action is configured to move the icon out of a predetermined area around the icon in the display. If the terminal device determines that the duration of the pressing does not exceed the predetermined threshold, or that the dragging action is configured to move the icon out of the predetermined area around the icon in the display, the terminal device can determine that the first operation instruction does not satisfy the predetermined conditions.

Figure 2:
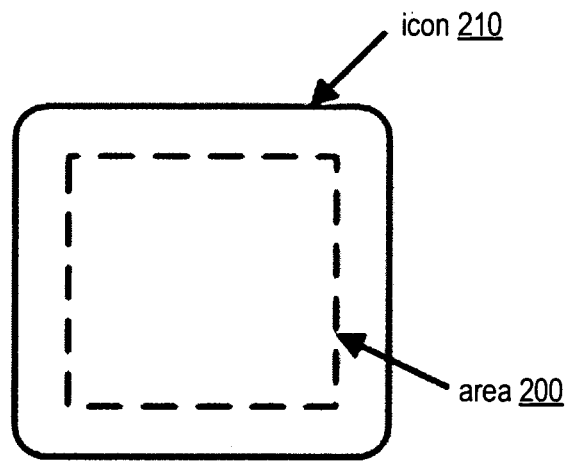
FIG. 2 is a schematic diagram illustrating an exemplary interface for acquiring and processing operation instructions, consistent with embodiments of the present disclosure.

There are different ways to detect whether a dragging action is configured to move the icon out of the predetermined area. Reference is now made to FIG. 2, which illustrates an exemplary interface 200 for detecting and processing the dragging action, consistent with embodiments of the present disclosure. As shown in FIG. 2, interface 200 displays an icon 210. Interface 200 also includes a predetermined area 200 which is marked by dotted lines. In some embodiments, as shown in FIG. 2, predetermined area 220 can overlap with at least part of icon 210. The predetermined area can be rectangular shape, or any other shape. The center point of predetermined area 220 can also align with the center point of icon 210.

In some embodiments, the terminal device can detect, in real-time, the displayed location of the center point of icon 210 (or an anticipated display location of the center point responsive to a dragging action command). If the center point of icon 210 is detected to be located outside of predetermined area 200 responsive to a dragging action, the terminal device can determine that the dragging action is configured to move the icon out of the predetermined area, and that the predetermined conditions are not satisfied in step S103 of method 100, as discussed above. If the center point of icon 210 is detected to be located within predetermined area 200, the terminal device can determine that the icon has not been moved out of the predetermined area, and that the predetermined conditions are satisfied in step S103.

Referring back to FIG. 1, in some embodiments, the predetermined conditions can include other criteria, such as a function of the app. For example, the terminal device can determine whether the icon aimed by the first operation instruction is associated with an app that is capable of processing speeches and/or motions. In some embodiments, if the terminal device determines that the app is not capable of processing speeches and/or motions, it can determine that predetermined conditions are not satisfied.

On the other hand, in some embodiments, the terminal device does not predicate the satisfaction of the predetermined conditions upon whether the app is capable of processing speech. Instead, after the terminal device determines that the predetermined conditions are satisfied (e.g., based on the duration of pressing action exceeding the predetermined threshold, and that the icon was not dragged out of the predetermined area, etc.), the terminal device determines whether the app is capable of processing speech, and determines how to process a subsequent second operation instruction that includes a speech instruction, as to be discussed below.

After determining that the first operation instruction satisfies the predetermined conditions in step S103, the terminal device can perform step S104 to monitor for a second operation instruction, and to transmit the second operation instruction to the app for processing. As discussed before, the second operation instruction can include a speech instruction. The second operation instruction can also include a motion (e.g., a manipulation of the display, a motion of the terminal device, etc.), or any kind of instruction the app is capable of processing.

In some embodiments, method 100 can be used to provide inputs to an app that is configured to provide information in response to an audio query and/or request. As an illustrative example, the app can provide telephone query service. In step S104, after receiving the first operation instruction and determining that the predetermined conditions are satisfied, the terminal device monitors for an audio query for a telephone number as a second operation instruction. After receiving the audio query, the terminal device transmits the query to the app. The transmission enables the app to provide the information (e.g., a telephone number) in response to the query.

As another illustrative example, the app can include a player of multimedia files. After receiving the first operation instruction, the terminal device monitors for an audio request for multimedia file as a second operation instruction. In step S104, after receiving the request, the terminal device transmits the request to the app. The transmission enables the app to play the multimedia file as requested.

In some embodiments, as discussed before, the app targeted by the first operation instruction may not be capable of processing speech instructions. In this case, in step S104, the terminal device determines a second app (e.g., a speech recognition app) that is capable of converting a speech instruction to another form (e.g., a text transcription of the speech instruction). The terminal device then monitors for a speech instruction as the subsequent second operation instruction. After receiving the speech instruction, the terminal device can use the second app to convert the speech instruction, and then transmit the converted instruction to the app associated with the icon.

If the terminal device determines the predetermined conditions are not satisfied in step S103, the terminal device can perform step S105 to execute the first operation instruction as a standalone instruction. The execution can be based on the physical attributes associated with the instruction. For example, the terminal device may interpret a pressing action targeted at the icon of an app for a certain duration of time (but not exceeding the predetermined threshold required to satisfy the predetermined conditions, as determined in step S103) as representing an instruction for dragging the icon, and carry out the pressing action accordingly.

Figure 3:
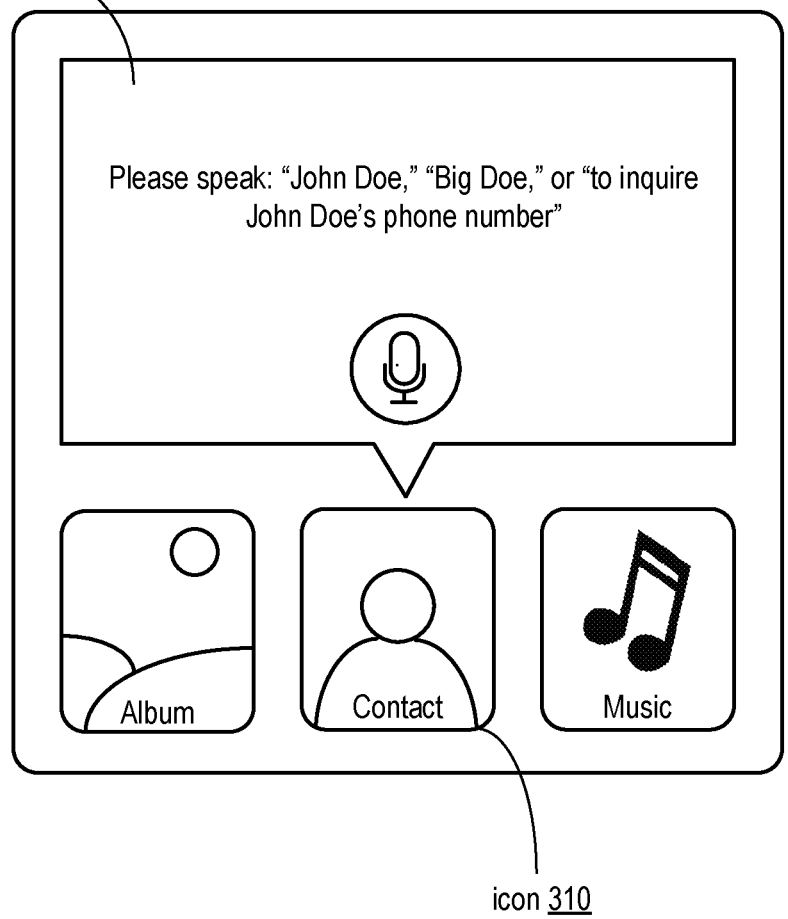
FIG. 3 is a schematic diagram illustrating an exemplary interface for facilitating an acquisition of operation instructions, consistent with embodiments of the present disclosure.

In some embodiments, when the terminal determines that the user has already input a first operation instruction that satisfies the predetermined conditions, in order to facilitate the input of a second operation instruction by the user, the terminal can give out prompt information to prompt the user to input the second operation instruction. The contents of the prompt information include, but are not limited to, texts, static/dynamic graphs, and audio information. Reference is now made to FIG. 3, which illustrates an exemplary interface 300 for facilitating an acquisition of the second operation instruction, consistent with embodiments of the present disclosure. As shown in FIG. 3, icon 310 is associated with an app that is configured to provide phone number query service and support speech operation. After the terminal device receives a first operation instruction aimed at icon 310, and determines that the predetermined conditions are satisfied, the terminal device can display a message 320. Message 320 can include suggestions to a user for the second operation instruction. The suggestions can include, for example, a query for a phone number. As shown in FIG. 3, the suggested content of the voice command includes the full name of the person whose phone number is inquired (e.g., "John Doe"), the nick name of that person ("Big Doe"), or a sentence ("To inquire John Doe's phone number"), etc. The user can either speak according to the suggested content, or provide other speech instructions. The terminal device can then process the speech instruction by, for example, transmitting it to the app associated with icon 310.

Embodiments of the present disclosure enables a user to operate an app by inputting two successive operation instructions, instead of first activating the app, waiting for it to be opened, and then inputting the instruction for the app. Therefore, the user operation becomes more convenient and efficient, and user experience can be enhanced.

Referring back to FIG. 1, at least some steps of method 100 can be realized using the components of an operating system of the terminal device. In some embodiments, the operating system can include Android™ components configured to manage the processes associated with the desktop and the installed apps. In some embodiments, the desktop and the installed apps are associated with a set of service processes, such as Android™ Desktop Service and Android™ App Service. When the operating system is started and before receiving the first operation instruction, the operating system can identify the installed apps that support speech operation. Specifically, the terminal device can store a list of identifiers associated with apps that are known to support speech operation. The terminal device can then determine that an installed app supports speech operation by looking up its identifier from the list. After confirming that an installed app supports speech operation, the operating system can create a connection between the service processes associated with the desktop and the confirmed app. The operating system can also create an object for the confirmed app, to facilitate transmission of information between the associated service processes.

As an illustrative example, as part of step S104, after the desktop's service process receives the second operation instruction targeted at the confirmed app, the operating system can use the object associated with the confirmed app to transmit, via the created connection, the second operation instruction to the targeted app's service process, which can then process the second operation instruction.

Moreover, with the operating system, the determination of whether the first operation instruction satisfies the predetermined conditions can further comprise the following steps:

First, the terminal device schedules the invocation of a process associated with the app. In some embodiments, the scheduling is achieved by adding a message (e.g., an invoke-interface message) configured to invoke a method associated with an Application Programming Interface (API), in a main thread message queue associated with the process.

Second, the terminal device determines whether the first operation instruction satisfies the predetermined conditions within a predetermined duration. In some embodiments, the duration is determined based on a timeout parameter associated with the message. The duration can be, for example, one second.

If the predetermined conditions are satisfied within the predetermined duration, the terminal device can, based on the message and through the main thread, invoke and execute the associated method. Through the execution of the method and the object associated with an app, the terminal device can transmit the second operation instruction to the app for processing, as part of step S104. If the predetermined conditions are not satisfied, the message is removed from the main thread message queue, and the first operation instruction is executed as a standalone instruction, as part of step S105.

The addition and removal of a message from the main thread message queue can be based on the detection of an event, and can be implemented using other components of the operating system. As an illustrative example, the predetermined conditions are satisfied after a pressing action targeted at the icon of an app for a predetermined duration of time (e.g., one second), and that the icon is not moved out of a predetermined area. To determine whether the predetermined conditions are satisfied, the operating system can detect an event at a touch interface of the terminal device (e.g., a touch-screen) directed at the icon. Such an event can include, for example, an Action_down event that indicates a pressing action, an Action_move event that indicates a dragging action, etc. After detecting such an event, the operating system can use the PostDelayed function to add a message to the main thread message queue, wherein the message is configured to invoke a method associated with an API, and set a timeout parameter associated with the API at one second. At the same time, to determine whether the icon is moved out of a predetermined area (e.g., as shown in FIG. 2), the operating system can also detect an Action_move event with respect to, for example, the center point of the icon.

As an illustrative example, if the center point of the icon remains in the predetermined area within the predetermined duration of one second, the main thread can then invoke and execute the associated method. In some embodiments, the method includes information about using an object associated with an app to transmit operation instruction from a desktop's service process to the app's service process. Therefore, when executing the associated method, the main thread can transmit the second operation instruction from the desktop's service process to the app's service process for processing.

On the other hand, if the center point of the icon is dragged out of the predetermined area within the predetermined duration of one second, the operating system can remove the message from the main thread message queue, and the first operation instruction is processed as a stand-alone instruction.

In some embodiments, the message added to the main thread message queue can be a message configured to invoke a method associated with a Runnable API. The addition and processing of the message can also be performed using an Android™ Handler mechanism. The method associated with the Runnable API can include a Run( )method. The connection between service processes can be created using the bindService function of Android™, and a Messenger object can be created for an app (e.g., the app that has been confirmed to process the second operation instruction). The Run( )method can include information about how to use the Messenger object to transmit an operation instruction (e.g., the second operation instruction) from the desktop's service process to the confirmed app's service process.

With such arrangements, where the main thread instead of a sub-thread is used to invoke the associated execution method, the stability of the system can be improved.

Although specific Android™ components are provided to illustrate the implementation of embodiments of the present disclosure, a person with ordinary skill in the art will understand that method 100 can be realized with suitable programming of any operating system, and that method 100 can be realized using any computer language codes, including but not limited to JAVA™ language codes.

Figure 4:
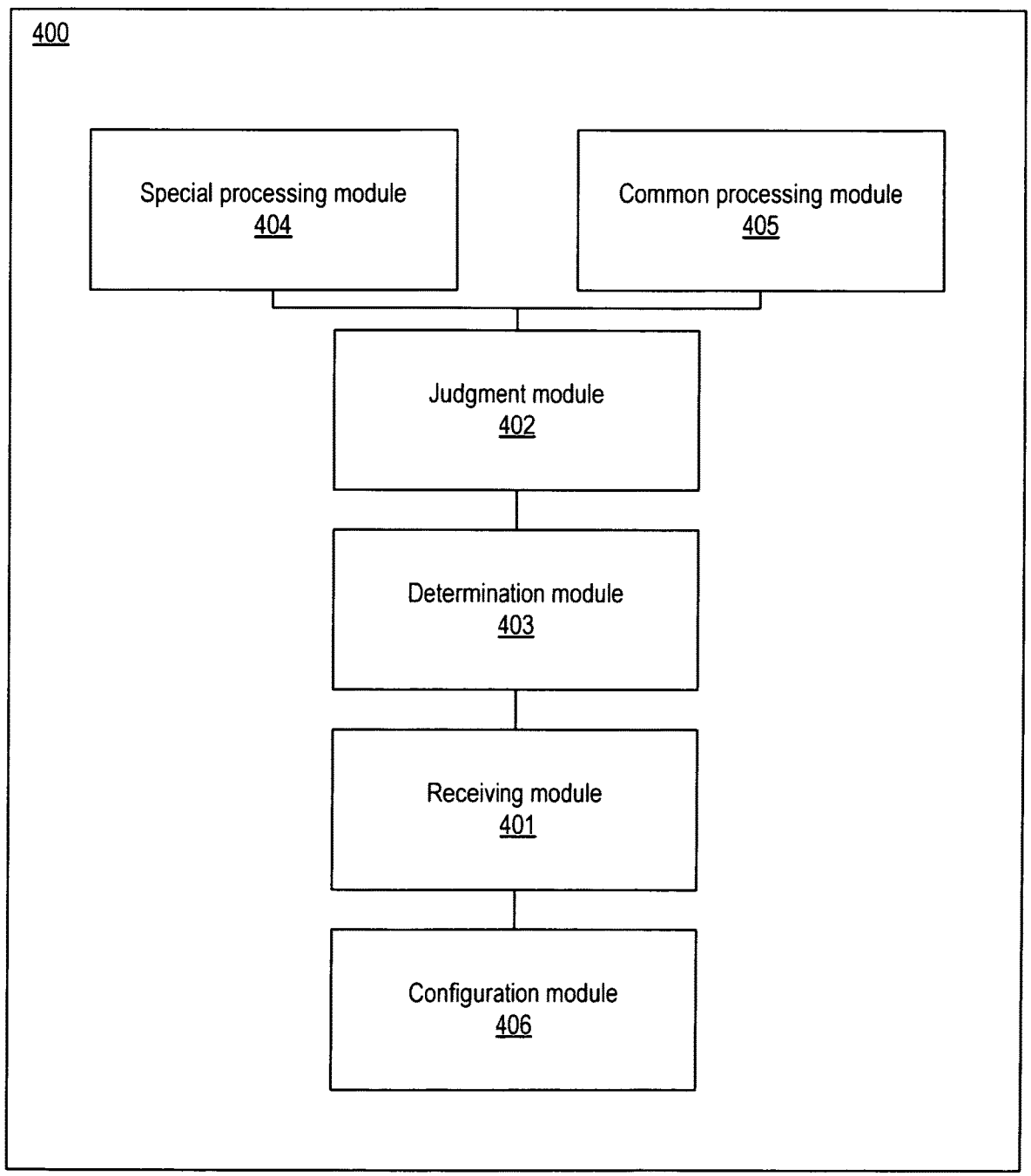
FIG. 4 is a block diagram illustrating an exemplary apparatus for acquiring and processing operation instructions, consistent with embodiments of the present disclosure.

FIG. 4 is a block diagram illustrating an exemplary apparatus 400 for acquiring and processing operation instructions, consistent with embodiments of the present disclosure. As shown in FIG. 4, apparatus 400 includes a receiving module 401, a judgment module 402, a determination module 403, a special processing module 404, and a common processing module 405. In some embodiments, apparatus 400 is configured to implement at least some of the steps of method 100 of FIG. 1.

Receiving module 401 is configured to receive one or more operation instructions input by a user. The one or more instructions can include a first operation instruction (e.g., a pressing action) and a second operation instruction (e.g., a speech instruction). In some embodiments, receiving module 401 is configured to implement at least part of step S101 of FIG. 1.

Judgment module 402 is configured to determine the app targeted by the first operation instruction received by receiving module 401. The determination can be based on detecting, for example, the first operation instruction directed to an icon associated with the app, where the icon is also displayed on apparatus 400. In some embodiments, judgment module 402 is configured to implement at least part of step S102 of FIG. 1.

Determination module 403 is configured to determine whether the first operation instruction satisfies one or more predetermined conditions. The determination can be based on, for example, a duration of the first operation instruction, whether the icon is dragged out of a predetermined area in the display of apparatus 400, etc. In some embodiments, the determination can also be based on a function of the app determined by judgment module 402 (e.g., whether the app is capable of processing speech instructions). If judgment module 402 determines that the first operation instruction satisfies the predetermined conditions, determination module 403 is configured to send the second operation instruction to special processing module 404. If the first instruction does not satisfy the predetermined conditions, determination module 403 is configured to send the first operation instruction to common processing module 405. In some embodiments, second determination module is configured to implement at least part of step S103 of FIG. 1.

Special processing module 404 is configured to transmit the second operation instruction to the app determined by judgment module 402. In some embodiments, after determination module 403 determines that the app determined by judgment module 402 is not capable of processing speech instructions, special processing module 404 is configured to also convert the second operation instruction (in the form of, speech instruction) to another form that can be processed by the app, and then transmit the converted instruction to the app. In some embodiments, special processing module 404 is configured to implement at least part of step S104 of FIG. 1.

Common processing module 405 is configured to execute the first operation instruction as a standalone instruction. The execution can be based on the physical attributes associated with the instruction. In some embodiments, common processing module 405 is configured to implement at least part of step S105 of FIG. 1.

In some embodiments, apparatus 400 further includes a configuration module 406. Configuration module 406 is configured to, prior to receiving the first operating command, confirm a function of an installed app (e.g., whether the app supports speech operation). In some embodiments, configuration module 406 is also configured to create a connection between service processes associated with the desktop and the confirmed app, and to create an object associated with the confirmed app to facilitate transmission of information between the service processes. In some embodiments, configuration module 406 is further configured to add a message configured to invoke a method associated with an API to the main thread message queue. Configuration module 406 can also set a predetermined duration based on a timeout parameter associated with the message, and determine whether the first operating command satisfies one or more predetermined conditions within the predetermined duration.

Apparatus 400 of FIG. 4 can be implemented as part of a terminal device. In some embodiments, apparatus 400 can be implemented as part of an operating system of the terminal device.

According to embodiments of the present disclosure, after a terminal device receives a first operation instruction from a user, it determines whether the first operation instruction satisfies one or more predetermined conditions, and based on the determination, determines to forward a second operation instruction from the user to the app for processing. With embodiments of the present disclosure, a user needs not wait for an app to open in the desktop in order to operate the app. Instead, a user only needs to input a first operation instruction that satisfies the predetermined conditions, and then input a second operation instruction, which the terminal device can then forward to the app for processing. Therefore, convenience and efficiency of operation can be enhanced, and user experience can be improved.

As will be understood by those skilled in the art, embodiments of the present disclosure may be embodied as a method, a system, or a computer program product. Accordingly, embodiments of the present disclosure may take the form of an entirely hardware embodiment, an entirely software embodiment, or an embodiment combining software and hardware. Furthermore, the present invention may take the form of a computer program product embodied in one or more computer available storage media (including but not limited to a magnetic disk memory, a CD-ROM, an optical memory and so on) containing computer available program codes.

Embodiments of the present disclosure are described with reference to flow diagrams and/or block diagrams of methods, devices (systems), and computer program products according to embodiments of the present invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams.

In a typical configuration, a computer device includes one or more Central Processing Units (CPUs), an input/output interface, a network interface, and a memory.

The memory may include forms of a volatile memory, a random access memory (RAM) and/or non-volatile memory and the like, such as a read-only memory (ROM) or a flash RAM in a computer readable medium. The memory is an example of the computer readable medium.

The computer readable medium includes non-volatile and volatile media, removable and non-removable media, wherein information storage can be implemented with any method or technology. Information may be modules of computer readable instructions, data structures and programs or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices or any other non-transmission media which may be used to store information capable of being accessed by a computer device. According to the definition of the context, the computer readable medium does not include transitory media, such as modulated data signals and carrier waves.

It will be further noted that the terms "comprises," "comprising," or any other variations are intended to cover non-exclusive inclusions, so as to cause a process, method, commodity or device comprising a series of elements to not only comprise those elements, but also comprise other elements that are not listed specifically, or also comprise elements that are inherent in this process, method, commodity, or device. Therefore, the element defined by a sentence "comprising a . . . " does not preclude the presence of other same elements in the process, method, commodity, or device including said elements under the condition of no more limitations.

As will be understood by those skilled in the art, embodiments of the present invention may be embodied as a method, a system or a computer program product. Accordingly, the present invention may take the form of an entirely hardware embodiment, an entirely software embodiment or an embodiment combining software and hardware. Furthermore, the present invention may take the form of a computer program product embodied in one or more computer available storage media (including but not limited to a magnetic disk memory, a CD-ROM, an optical memory and so on) containing computer available program codes.

One of ordinary skill in the art will understand that the above described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the present disclosure will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A computer-implemented method for acquiring and processing operation instructions, comprising:
   receiving, from a user, a first user interaction with respect to an icon associated with an application;
   determining whether the first user interaction satisfies one or more predetermined conditions indicating that a command is to be issued to the application;

responsive to determining that the first user interaction satisfies the one or more predetermined conditions indicating that a command is to be issued to the application:
  prompting the user to give a second user interaction to be sent to the application as a command, the second user interaction comprising a speech command,
  receiving the second user interaction before the application is activated, and
  responsive to receiving the second user interaction:
    invoking the application, and
    transmitting the second user interaction to the application without performing speech recognition of the speech command, wherein, after the second user interaction is transmitted to the application, the speech command is converted to a text transcription by the application to recognize a command and the recognized command is executed by the application.

2. The method according to claim 1, wherein determining whether the first user interaction satisfies the one or more predetermined conditions comprises determining that the first user interaction includes a pressing action or a gesturing action directed to at least part of the icon for a predetermined duration.

3. The method according to claim 2, wherein determining whether the first user interaction satisfies the one or more predetermined conditions comprises determining that the icon is not dragged out of a predetermined area within the predetermined duration after receiving the first user interaction.

4. The method according to claim 1, wherein determining whether the first user interaction satisfies the one or more predetermined conditions comprises determining that the application is associated with a predetermined function.

5. The method according to claim 4, further comprising providing one or more suggestions for the second user interaction when prompting the user to give the second user interaction, wherein the one or more suggestions are based on the predetermined function.

6. The method according to claim 1, wherein:
the second user interaction is received during an execution of a first process; and
transmitting the second user interaction to the application for execution comprises transmitting, via an object associated with the application, the second user interaction from the first process to a second process associated with the application.

7. The method according to claim 6, further comprising:
adding the second process to a schedule, wherein the execution of the second process is scheduled at a predetermined time;
determining whether the one or more predetermined conditions are satisfied before the predetermined time; and
responsive to determining that the one or more predetermined conditions are not satisfied before the predetermined time, removing the second process from the schedule.

8. The method according to claim 7, wherein determining whether the one or more predetermined conditions are satisfied before the predetermined time comprises determining whether one or more events associated with a touch interface has been detected.

9. The method according to claim 7, wherein adding the second process to a schedule comprises adding an invoke-interface message to a main thread message queue associated with the application.

10. The method according to claim 1, wherein determining whether the first user interaction satisfies the one or more predetermined conditions comprises determining that the application is capable of processing speech.

11. A system for acquiring and processing operation instructions, comprising:
a memory device that stores a set of instructions; and
at least one processor capable of executing the set of instructions to perform:
  receiving, from a user, a first user interaction with respect to an icon associated with an application;
  determining whether the first user interaction satisfies one or more predetermined conditions indicating that a command is to be issued to the application;
  responsive to determining that the first user interaction satisfies the one or more predetermined conditions indicating that a command is to be issued to the application:
    prompting the user to give a second user interaction to be sent to the application as a command, the second user interaction comprising a speech command,
    receiving the second user interaction before the application is activated, and
    responsive to receiving the second user interaction:
      invoking the application, and
      transmitting the second user interaction to the application without performing speech recognition of the speech command, wherein, after the second user interaction is transmitted to the application, the speech command is converted to a text transcription by the application to recognize a command and the recognized command is executed by the application.

12. The system according to claim 11, wherein determining whether the first user interaction satisfies the one or more predetermined conditions comprises determining that the first user interaction includes a pressing action or a gesturing action directed to at least part of the displayed icon for a predetermined duration.

13. The system according to claim 12, wherein determining whether the first user interaction satisfies the one or more predetermined conditions comprises determining that the displayed icon of the application is not dragged out of a predetermined area within the predetermined duration after receiving the first user interaction.

14. The system according to claim 11, wherein determining whether the first user interaction satisfies the one or more predetermined conditions comprises determining that the application is associated with a predetermined function.

15. The system according to claim 11, wherein:
the second user interaction is received during an execution of a first process; and
transmitting the second user interaction to the application for execution comprises transmitting, via an object associated with the application, the second user interaction from the first process to a second process associated with the application.

16. The system according to claim 15, wherein the at least one processor is configured to execute the set of instructions to cause the system to further perform:
adding the second process to a schedule, wherein the execution of the second process is scheduled at a predetermined time;
determining whether the one or more predetermined conditions are satisfied before the predetermined time; and responsive to determining that the one or more predetermined conditions are not satisfied before the predetermined time, removing the second process from the schedule.

17. The system according to claim 16, wherein determining whether the one or more predetermined conditions are satisfied before the predetermined time comprises determining whether one or more events associated with a touch interface is detected.

18. The system according to claim 16, wherein adding the second process to a schedule comprises adding an invoke-interface message to a main thread message queue associated with the application.

19. The system according to claim 11, wherein determining whether the first user interaction satisfies the one or more predetermined conditions comprises determining that the application is capable of processing speech.

\* \* \* \* \*